United States Patent
Brehm et al.

[11] Patent Number: 5,615,860
[45] Date of Patent: Apr. 1, 1997

[54] ELECTROMAGNETIC VALVE

[75] Inventors: Werner Brehm, Hemmingen; Walter Fleischer, Stuttgart, both of Germany

[73] Assignee: Robert Bosch GmbH, Stuttgart, Germany

[21] Appl. No.: 289,749

[22] Filed: Aug. 12, 1994

[30] Foreign Application Priority Data

Aug. 26, 1993 [DE] Germany .......................... 43 28 709.3

[51] Int. Cl.⁶ .................................................. F16K 31/06
[52] U.S. Cl. ............................. 251/129.07; 137/454.2; 137/625.65; 251/129.16; 251/205
[58] Field of Search ....................... 137/454.2, 454.5, 137/454.6, 625.65; 251/205, 123, 129.07, 129.16

[56] References Cited

U.S. PATENT DOCUMENTS 4,407,323  10/1983  Neff ..................................... 137/454.2
4,971,116  11/1990  Suzuki et al. ...................... 137/625.65
5,197,507   3/1993  Miki et al. ...................... 137/625.65 X
5,247,965   9/1993  Oka et al. ........................... 137/625.65

*Primary Examiner*—Stephen M. Hepperle
*Attorney, Agent, or Firm*—Michael J. Striker

[57] ABSTRACT

An electromagnetic valve, in particular pressure regulating valve for automatic transmissions of motor vehicles comprises a magnet housing, a valve closing element arranged in the magnet housing and having a longitudinal opening and control edges, a valve slider located in the longitudinal opening and having control portions cooperating with the control edges with the valve closing element, the valve closing element being formed as a die cast part and the control edges being formed as a pocket-shaped depressions extending from an outer periphery.

8 Claims, 3 Drawing Sheets

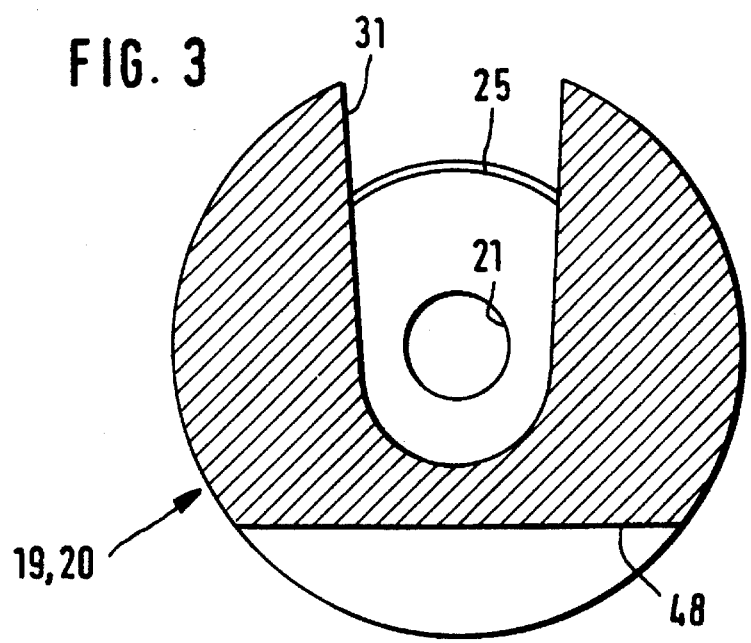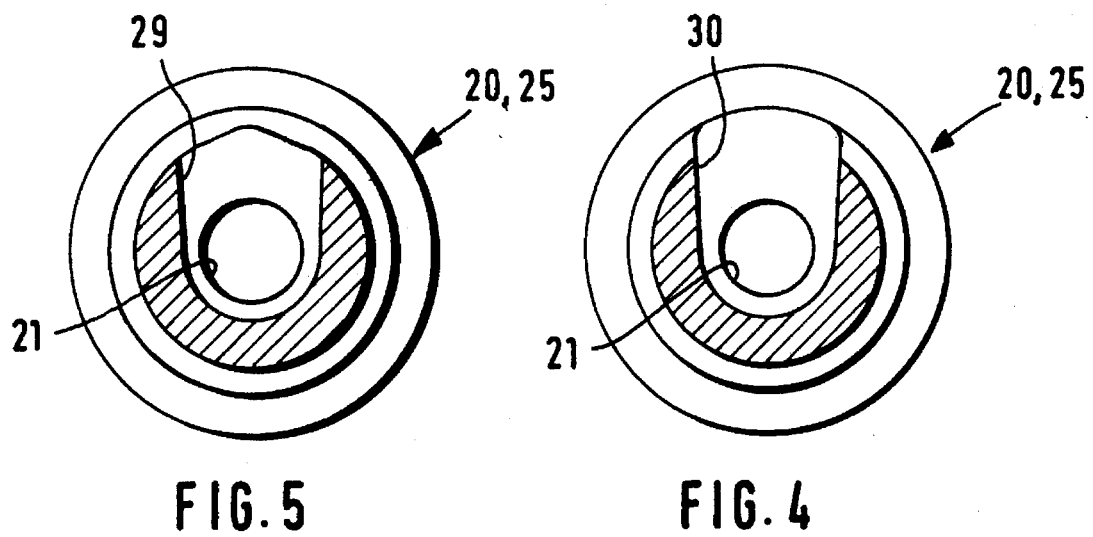

ELECTROMAGNETIC VALVE

BACKGROUND OF THE INVENTION

The present invention relates to an electromagnetic valve, in particular a pressure regulating valve for automatic transmissions of motor vehicles.

Electromagnetic valves of the above mentioned general type are known in the art. One of such electromagnetic valves is disclosed for example in the German document DE-GM 82 20 790. The electromagnetic valve disclosed in this document has a magnet housing with a valve closing element mounted on it. The valve closing element serves on the one hand for hydraulic connection at the place of mounting and on the other hand has a longitudinal opening of a valve slider which has control portions cooperating with control edges of the valve closing element. The valve closing element such as an electromagnetic valve is a rotary part produced in a material removing process, and the material as a rule is aluminum. The material removal expense is very high for this, and the machining during the manufacture is expensive and complicated. In particular the production of the control edges is complicated and expensive since as a rule they are formed as control grooves which surround the longitudinal opening. The rotary tool for producing the control grooves is inserted the longitudinal opening and moved. To the smooth side of the conventional pressure regulating valves the tool required for this work is prone to vibrations and breakage. Moreover, during the machining of the valve closing element a lot of particles and chips are produced, which must be subsequently mechanically removed. During the formation of the ring grooves and control edges on the longitudinal opening of the valve closing element it is necessary as a rule to clamp the workpiece around since a machining of the control grooves from only one side can lead to unfavorably long rotary tools.

SUMMARY OF THE INVENTION

Accordingly, it is an object of the present invention to provide an electromagnetic valve, in particular a pressure regulating valve for automatic transmissions of motor vehicles, which avoids the disadvantages of the prior art.

In keeping with these objects and with others which will become apparent hereinafter, one feature of the present invention resides, briefly stated, in an electromagnetic valve, in particular pressure regulating valve for automatic transmissions of motor vehicles, which has a magnet housing and a valve closing element arranged on the magnet housing and having a longitudinal opening for receiving a valve slider provided with control portions cooperating with control edges in the valve closing element, wherein the valve closing element is formed as edges formed as pocket-molded depressions extending the outer periphery.

When the electromagnetic valve is designed in accordance with the present invention, the valve closing element can be produced in a simple and cost favorable manner. In contrast to conventional electromagnetic valves, no control grooves must be provided, but instead pocket molded depressions are formed by a molding tool, to cooperate with the longitudinal opening. The removing expense is therefore substantially reduced and clamping of the tool is not necessary. A further advantage is that due to the molding tool connected distances of the depressions and thereby the control edges, a uniform quality or tolerance of the electromagnetic valve in great numbers is guaranteed.

It is especially advantageous when the depressions reduce toward the longitudinal opening of the valve closing element, since thereby an improved withdrawal of the workpiece from the mold is possible.

In a further embodiment of the present invention the depressions are formed as fine control notches, which can be formed in molding process and therefore lead in a simple and cost favorable manner (without the post-machining) to an improvement of the hydraulic properties of the electromagnetic valve.

It is further advantageous when in the molding process or by the molding tool a rotation preventing notch is formed on the valve closing element, by which it is possible to provide a definite mounting position of the closing element or electromagnetic valve. In this case the rotation preventing notch also does not require a post-machining, since in contrast to the material removing production no particles or chips are removed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3–5 are views showing a section through the valve closing element of the inventive electromagnetic valve taken along the lines III—III, IV—IV and V—V.

DESCRIPTION OF THE PREFERRED EMBODIMENTS

Figure 1:
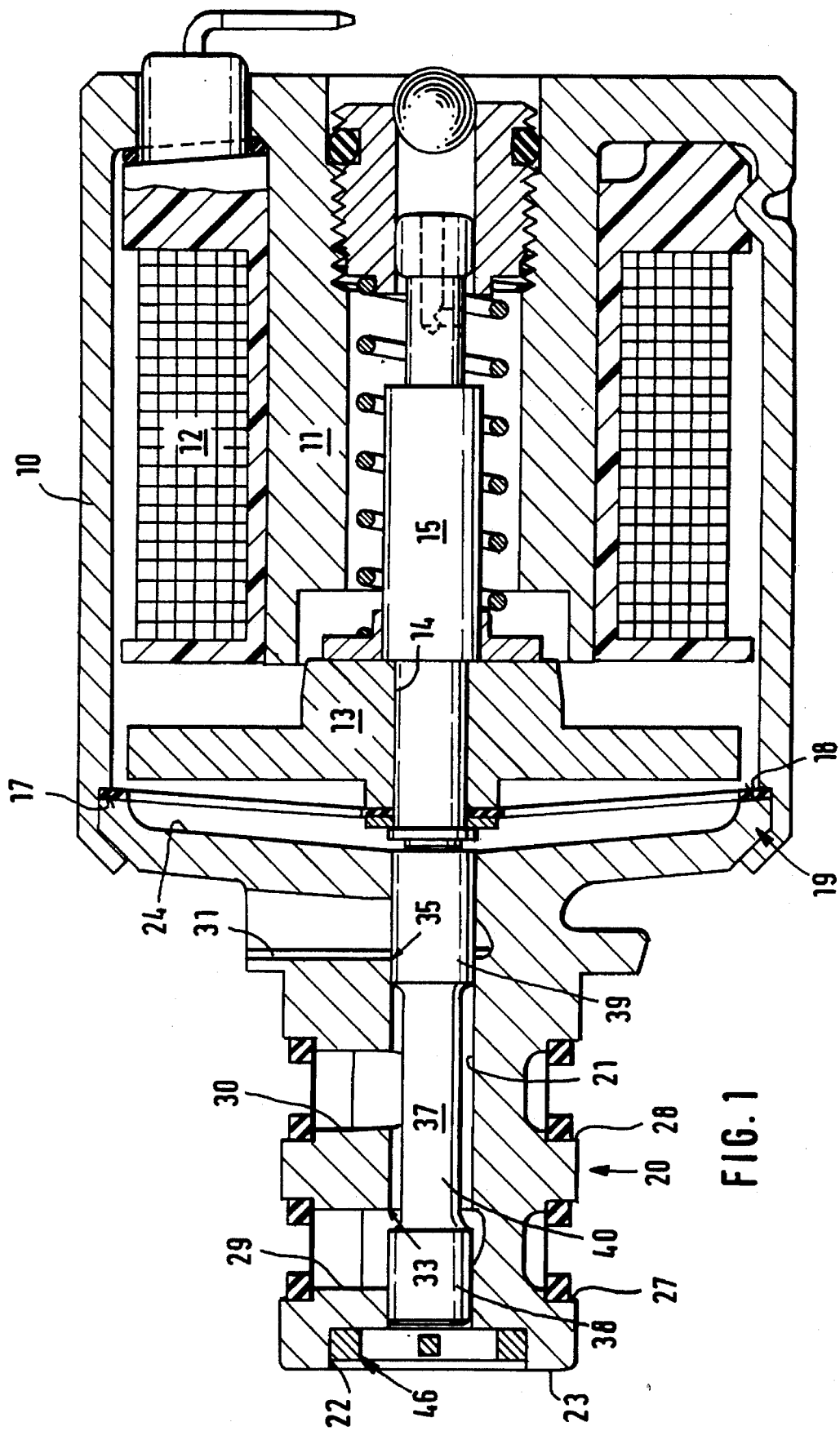
FIG. 1 is a view showing a longitudinal section of an electromagnetic valve in accordance with the present invention.

FIG. 1 shows an electromagnetic valve which in this embodiment is a pressure regulating valve as used in automatic transmissions of motor vehicles. It has a cup-molded magnet housing 10 with an inwardly located magnetic core 11 surrounded by a magnetic coil 12. It cooperates with a disc-molded magnetic armature 13 arranged in front of its end side and provided with a central opening 14 for a plunger 15.

The magnet housing 10 is provided in the region of its open end side with an inwardly located circumferential projection 17, and the end side of the closing flange 19 of a valve closing element 20 abuts against the projection. The free edge of the magnet housing 10 is flanged so as to fixedly connect the magnet housing and the closing flange 19. The valve closing element 20 has a throughgoing longitudinal opening 21 extending from a cylindrical depression 22 in the free end side 23 of the valve closing element 20. The longitudinal opening 21 opens into a cylindrical depression 24 in the end side 18 facing the magnet housing.

Figure 2:
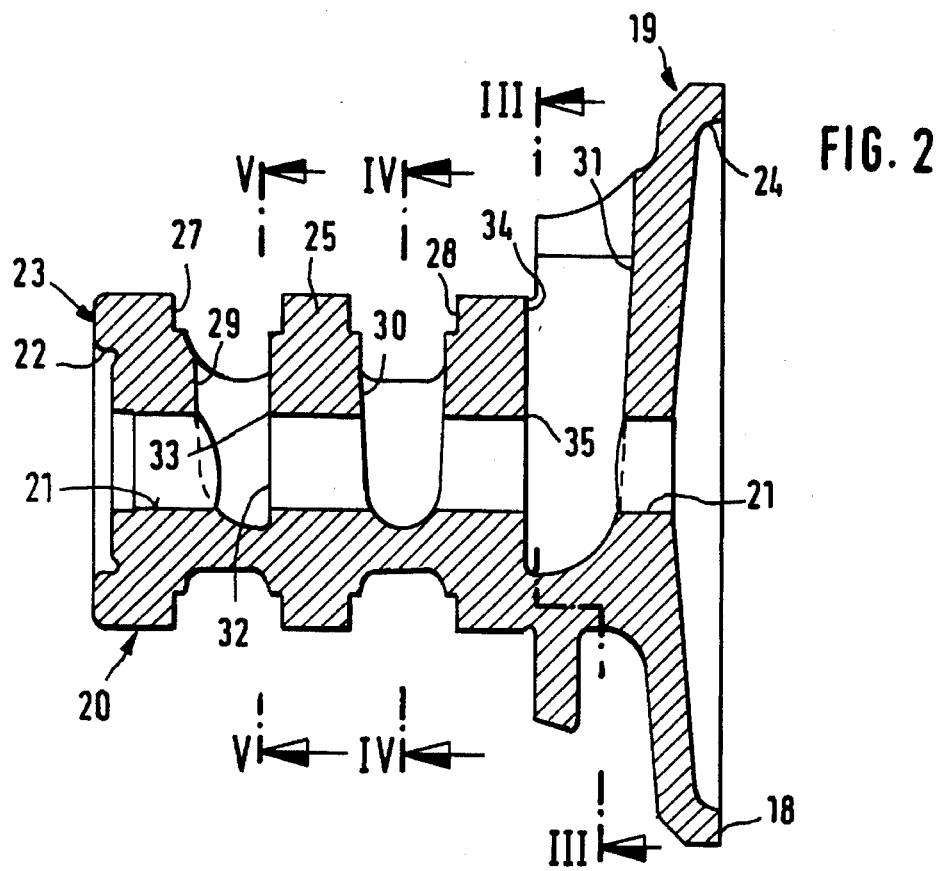
FIG. 2 is a view showing a longitudinal section through a valve closing element of the inventive electromagnetic valve.

Two stepped ring grooves 27 and 28 are formed at a distance from one another on the outer periphery of the valve closing element 20 (as shown in FIG. 2) in the region of a cylindrical portion 25. A pocket-molded depression 29 extends from the left ring groove 27 through the longitudinal opening 21. A similar pocket-molded depression 30 extends from the right ring groove 28 through the longitudinal opening 21. A third pocket-molded depression 31 is formed in the transition region of the cylindrical portion 25 to the closing flange 19 and extends also through the longitudinal opening 21.

The first (left) depression 29 has a semi-circular cross-section as can be seen from FIG. 5. The flattened side 32 is formed on the side facing the magnet housing 10 and its throughgoing region through the longitudinal opening 21 operates as a first control edge 33. The second (central) depression 30 has a substantially circular cross-section with two oppositely flattened sides which are oriented substantially perpendicular to the longitudinal axis of the longitudinal opening 21. The third (right) depression 31 also has a semi-spherical greater cross-section. Its flattened side 34 faces the free end side 23 of the valve closing element 20. The throughgoing course of the flattened side 34 and the longitudinal opening 21 serve as second control edge 35.

The three depressions 29, 30, 31 reduce from their opening on the periphery of the valve closing element 20 to the longitudinal opening 21. The remaining sides of the depression up to the both flattened sides 32 and 34 of the depressions 29 and 31 are formed so that they are inclined relative to the axis of symmetry of the corresponding depression.

In the longitudinal opening 21, a valve slider 37 is guided and is composed of two piston portions 38 and 39 and an intermediate piston neck 40 of a smaller diameter. The both piston portions 38 and 39 are guided tightly and slidingly in the longitudinal opening 21. The transition between the piston portion 38 and the piston neck 40 cooperates with the first control edge 33 while the transition between the piston neck 40 and the piston portion 39 cooperates with the second control edge 35. The piston portion 39 abuts against the plunger 15 of the magnet armature 13.

Figure 6:
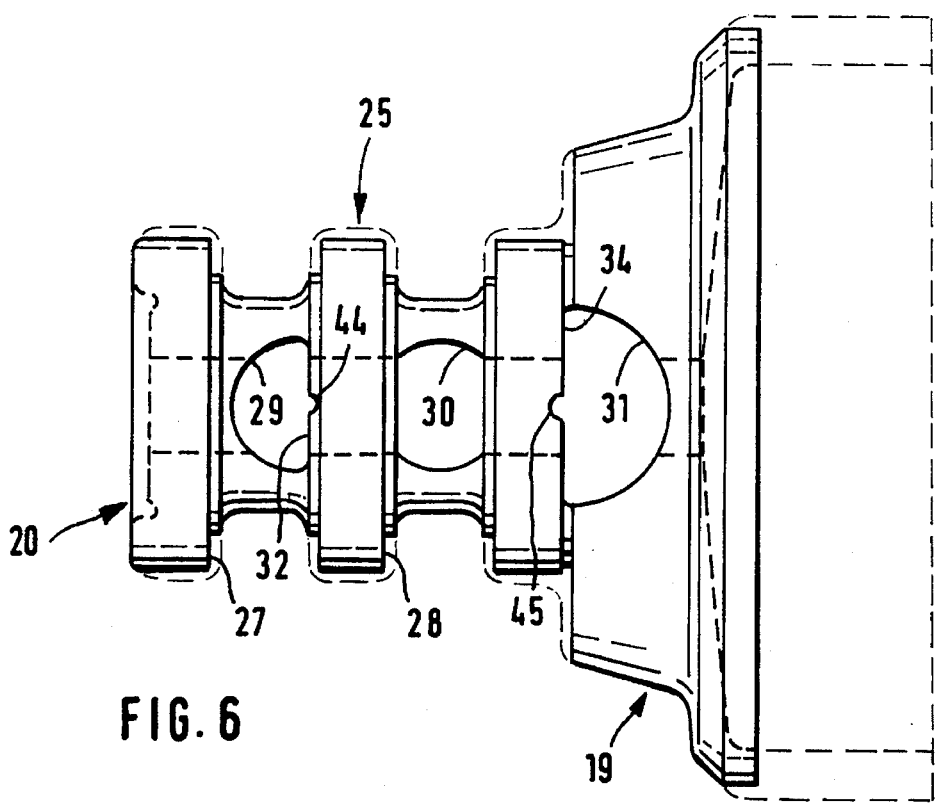
FIG. 6 is a view showing a valve closing element in which the outer contours of the molded intermediate workpiece are identified with broken lines.

Fine control notches 44 and 45 can be formed for example on the flattened sides 32 and 34 of the depressions 29 and 31. They cooperates with the piston portions 38 and 39 in the known manner. These fine control notches are shown for example in FIG. 6. The fine control notches 44 and 45 in the depressions 29 and 31 or in their flattened sides 32 and 34 can be formed in a simple manner by molding process.

During the operation of the pressure regulating valve the left ring groove 27 and thereby the depression 29 are connected with a not shown pressure medium source. The right ring groove 28 and thereby the central depression 30 are connected with a consumer whose pressure is to be regulated.

The right depression 31 is connected with a not shown return or container. From the right ring groove 28 a not shown return conduit leads to the free end side 23 or the longitudinal opening 21 on the end side of the valve slider 37. The valve slider is secured by a not shown safety ring or a sieve insert 46 in the longitudinal opening 21. This safety ring or the sieve insert 46 serve as an abutment for the valve slider 37. In the pressure regulating operation the pressure medium flowing from the pressure medium source is brought by a known regulating process to the consumer pressure. The both piston portions 38 and 39 of the valve slider 37 cooperate with both control edges 33 and 35, so that due to the oppositely influenced throttle cross-sections a regulating equilibrium is adjusted. Due to the corresponding current supply to the magnetic coil 12, also it is possible to adjust the pressure to be regulated in a known manner.

The valve closing element 20 is formed as a die cast part. The production is performed by a molding process in which the outer contours of excessive size are shown in broken lines and the size-accurate depressions 29–31 are molded out. The molding tool can be composed of two mold splits which preform the valve closing element and in which the slider is pressed in from the latter end side 18. After the removing from the mold, the corresponding workpiece is finished up to the longitudinal opening 21 and a machining allowance on the outer periphery shown in FIG. 6 by a broken line. The depressions 29–31 and the not shown rotary prevention notches on the closing flange 19 as well as the mounting flattening 48 are already molded.

After removing from the mold of the valve closing element blank a post-working of the outer contour is performed. This can be performed with a simple molding tool (for example during removal of the separating grate). However, the outer periphery of the cylindrical portion 25 (transmission adjustment during utilization as pressure regulating valve in automatic transmissions) must be worked accurately due to the relatively small tolerances. A single machining is possible, or in other words a clamping of the blank during the post-working is dispensed with. Finally, the longitudinal opening 21 is produced, and eventually reamed and honed or spherically calibrated. The cylindrical depression 22 for receiving the safety ring or sieve insert 46 can be also formed in the same manner from the same side (end side 23). This can be performed after or before the formation of the longitudinal opening 21. However, it can be also performed simultaneously with this, when the longitudinal drill is formed as a stepped tool.

An especially suitable material for the production of the die cast valve closing element is GD-AlSi9Cu3, since this material is relatively brittle and thereby the chips produced during the working of the outer contour are easily broken and as a result the molding mark formation is minimized.

The production cost for the valve closing element can be lowered to under 30% when compared with the conventional aluminum machined parts due to the above described construction.

In addition to the above described manufacturing advantages, the die cast valve closing element has also operational advantages. The depressions have a lower current resistance when compared with ring passages with transverse openings during conventional, machined valve closing elements. Thereby the response time of the regulating valve is improved especially at low temperatures and therefore low viscosities of the pressure medium. Due to the formation of the fine control notches in the valve control element, a vibration suppression of the regulating system is possible without additional expenses.

In the conventional valve closing elements such precontrol notches are not simultaneously manufactured and must be formed with considerable expense on the valve slider 37.

The distance between both control edges 33 and 35 in the above described valve closing element 20 is a molding-connected distance and thereby is easy to maintain especially during the series production of such elements. In contrast to the conventional valve closing elements with machined control grooves, the diameter of the longitudinal opening 21 and thereby the diameter of the valve slider 37 are not limited downwardly by the manufacturing process, since the machining of the corresponding ring grooves is dispensed with and therefore the diameter can be considerably reduced. Thereby with the same structural size the magnetic element provides higher regulating pressures.

It will be understood that each of the elements described above, or two or more together, may also find a useful application in other types of constructions differing from the types described above.

While the invention has been illustrated and described as embodied in an electromagnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An electromagnetic valve, comprising a magnet housing; a valve closing element arranged in said magnet housing and having a longitudinal opening and control edges; a valve slider located in said longitudinal opening and having control portions cooperating with said control edges with said valve closing element, said valve closing element being formed as a die cast part and said control edges being formed as a pocket-shaped depressions extending from an outer periphery, said depressions reducing in cross-section toward said longitudinal opening.

2. An electromagnetic valve as defined in claim 1, wherein said depressions each have at least one flattened side.

3. An electromagnetic valve as defined in claim 1, wherein said depressions are provided with regional control edges with cast fine control notches.

4. An electromagnetic valve as defined in claim 1, wherein said valve closing element has an outer periphery provided with at least one rotation preventing notch.

5. An electromagnetic valve, comprising a magnet housing; a valve closing element arranged in said magnet housing and having a longitudinal opening and control edges; a valve slider located in said longitudinal opening and having control portions cooperating with said control edges with said valve closing element, said valve closing element being formed as a die cast part and said control edges being formed as a pocket-shaped depressions extending from an outer periphery, said valve closing element having an outer periphery provided with at least one rotation preventing notch.

6. An electromagnetic valve as defined in claim 1, wherein said depressions reducing in cross-section toward said longitudinal opening.

7. An electromagnetic valve as defined in claim 5, wherein said depressions each have at least one flattened side.

8. An electromagnetic valve as defined in claim 5, wherein said depressions are provided with regional control edges with cast fine control notches.

\* \* \* \* \*